United States Patent [19]

Sasaki

[11] Patent Number: 4,840,499
[45] Date of Patent: Jun. 20, 1989

[54] DISPLAY CONTROL DEVICE FOR A TYPEWRITER WHICH DISPLAYS BOTH INPUT CHARACTERS AND FORMAT INFORMATION

[75] Inventor: Ryoichi Sasaki, Nagoya, Japan

[73] Assignee: Brother Kogyo Kabushiki Kaisha, Aichi, Japan

[21] Appl. No.: 130,169

[22] Filed: Dec. 8, 1987

[30] Foreign Application Priority Data

Dec. 9, 1986 [JP] Japan ................... 61-293007

[51] Int. Cl.$^4$ .............................................. B41J 3/46
[52] U.S. Cl. ....................................... 400/83; 400/279
[58] Field of Search ................. 400/76, 83, 279, 705.1

[56] References Cited

U.S. PATENT DOCUMENTS

| | | | |
|---|---|---|---|
| 4,220,417 | 9/1980 | Sprott et al. | 400/279 X |
| 4,223,393 | 9/1980 | Abe et al. | 400/279 X |
| 4,240,758 | 12/1980 | Acosta | 400/279 |
| 4,661,000 | 4/1987 | Shinbori | 400/83 |
| 4,695,172 | 9/1987 | Ueno et al. | 400/83 |
| 4,728,964 | 3/1988 | Sasaki | 400/76 X |
| 4,737,922 | 4/1988 | Ogasawara et al. | 400/279 X |

FOREIGN PATENT DOCUMENTS

| | | | |
|---|---|---|---|
| 0112060 | 6/1984 | European Pat. Off. | 400/83 |
| 2913624 | 10/1980 | Fed. Rep. of Germany | 400/83 |
| 3110297 | 1/1982 | Fed. Rep. of Germany | 400/83 |
| 3606360 | 9/1987 | Fed. Rep. of Germany | 400/83 |
| 0030885 | 3/1981 | Japan | 400/83 |
| 60-58511 | 12/1985 | Japan . | |
| 0002583 | 1/1986 | Japan | 400/83 |
| 1596254 | 8/1981 | United Kingdom . | |

OTHER PUBLICATIONS

IBM Technical Disclosure Bulletin, "Cursor Left-/Right/Up/Down", Adam et al., vol. 25, No. 1, Jun. 1982, pp. 221–222.
IBM Technical Disclosure Bulletin, "Column Separators for CRT Display", Millar et al., vol 25, No. 4, Sep. 1982, pp. 2030–2031.
IBM Technical Disclosure Bulletin, "Positioning of Displayed Text", Adam et al., vol. 25, No. 4, Sep. 1982, p. 2162.

Primary Examiner—Ernest T. Wright, Jr.
Attorney, Agent, or Firm—Oliff & Berridge

[57] ABSTRACT

Disclosed is a display control device which supplies the associated display screen with not only character information inputted by a user but also with the format information indicating the format situation around the current cursor position, so that a user can know the format situation of both the region where data are being entered and moreover the blank area where no character data have yet been entered, therefore advantageously making the display screen smaller relative to the sheet and the entire structure simpler.

5 Claims, 6 Drawing Sheets

DISPLAY CONTROL DEVICE FOR A TYPEWRITER WHICH DISPLAYS BOTH INPUT CHARACTERS AND FORMAT INFORMATION

BACKGROUND OF THE INVENTION

The invention generally relates to a display control device for electronic typewriters. The display control device described in the following specification comprises a display unit on which input characters and format information indicating margins and such are displayed. The device is particularly for electronic typewriters which have a small display screen, which conventionally shows only input characters to assure the word spelling or such kind of purpose. However, in such prior art, it is hardly possible to check where the input character would be printed on the sheet.

In order to compensate for such deficiency, a second display screen was designed to indicate the position of input characters, for example the display control device of the published examined patent application no. Sho 60-58511. Nevertheless, this prior art display control device still has the deficiency that a wider space is required to contain two display screens, so that the overall structure is complicated.

SUMMARY OF THE INVENTION

Therefore it is an object of the invention to provide a display control device for printers which shows format information on a display unit as well as characters inputted from a keyboard.

In detail, a display control device for a typewriter is disclosed comprising: input means for inputting character data and format setting data; format memory means for storing the format setting data; a display unit having a plurality of display positions, each of them being able to display a character corresponding to the character data inputted by the input means; and control means for displaying individual forms, according to the format setting data stored in the format memory means, within each of the display positions before the character data is inputted, and for displaying the character in place of the individual form when the character data is inputted.

With reference to FIG.1, the display control device comprises a keyboard P1 and a display unit P2 where the format information is displayed in the manner that, briefly, the format information is shown with the predetermined indication system on the unit P2 as an initial condition. In detail, format information such as that for the right and left margins, ( denoted as RM and LM, respectively, in this specification ), tabulation, hot zone and so on, are shown on the display unit P2 with their respective indications. These indications are replaced by characters as these characters are input through the keyboard P1, so that input characters and format information are compositely displayed on the same line of the display screen. It is advantageous that there is no need for a plurality of display screens, one for indicating the format information to a user.

Even on a display screen comparatively small relative to the printing sheet, format conditions both around the current input position and the blank area where no character data is entered, are apparent from the format indications. Thus a compact display screen relative to the sheet size may be utilized.

Further the device features a similar advantage when applied to a typewriter with a large display screen, that the current input position is understood easily from the display in regard to the overall layout, which is particularly advantageous if the sheet is much larger than the display screen.

BRIEF DESCRIPTION OF ATTACHED DRAWINGS

The attached drawings will aid better comprehension of the invention in the advantages and features thereof, in which:

FIG.1 illustrates the heart of the invention, in which the display unit shows examples of format information, FIG. 2A is a diagram showing the constitution of one of the embodiments of the invention, FIG. 2B is a diagram showing the constitution of a keyboard of one of the embodiments of the invention, FIG. 3 and FIGS. 4A-4E illustrate display examples which the embodiment arranges on the display unit, and FIGS. 5A and 5B are for charts depicting how initialization and subsequent session proceed with respect to the invention.

DETAILED DESCRIPTION OF THE PREFERRED EMBODIMENT

Figure 1:
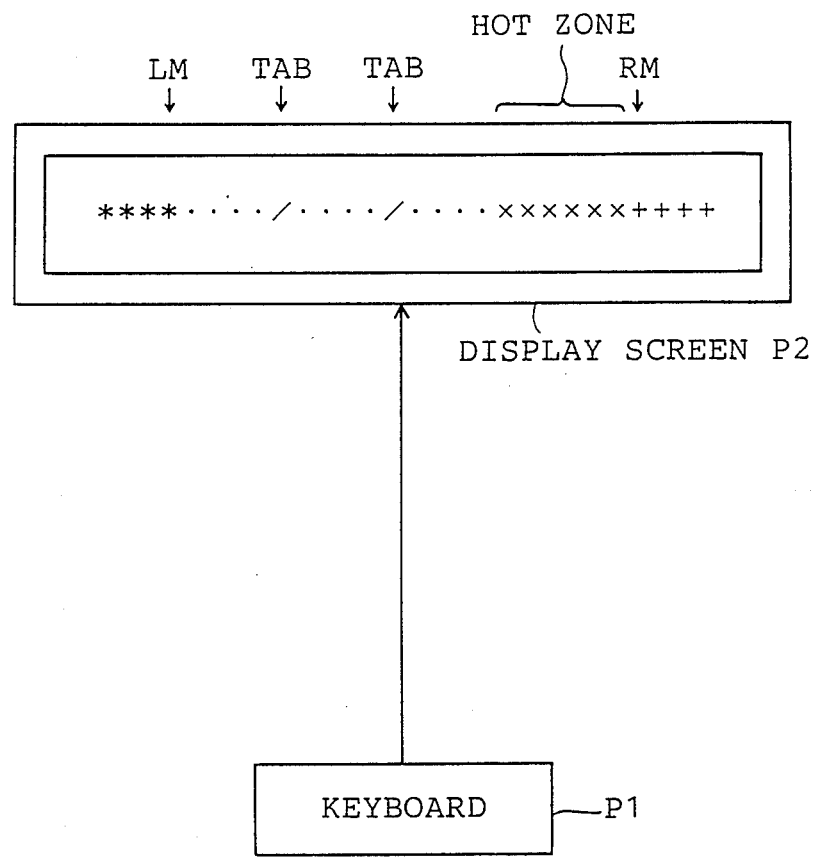
Figure 2A:
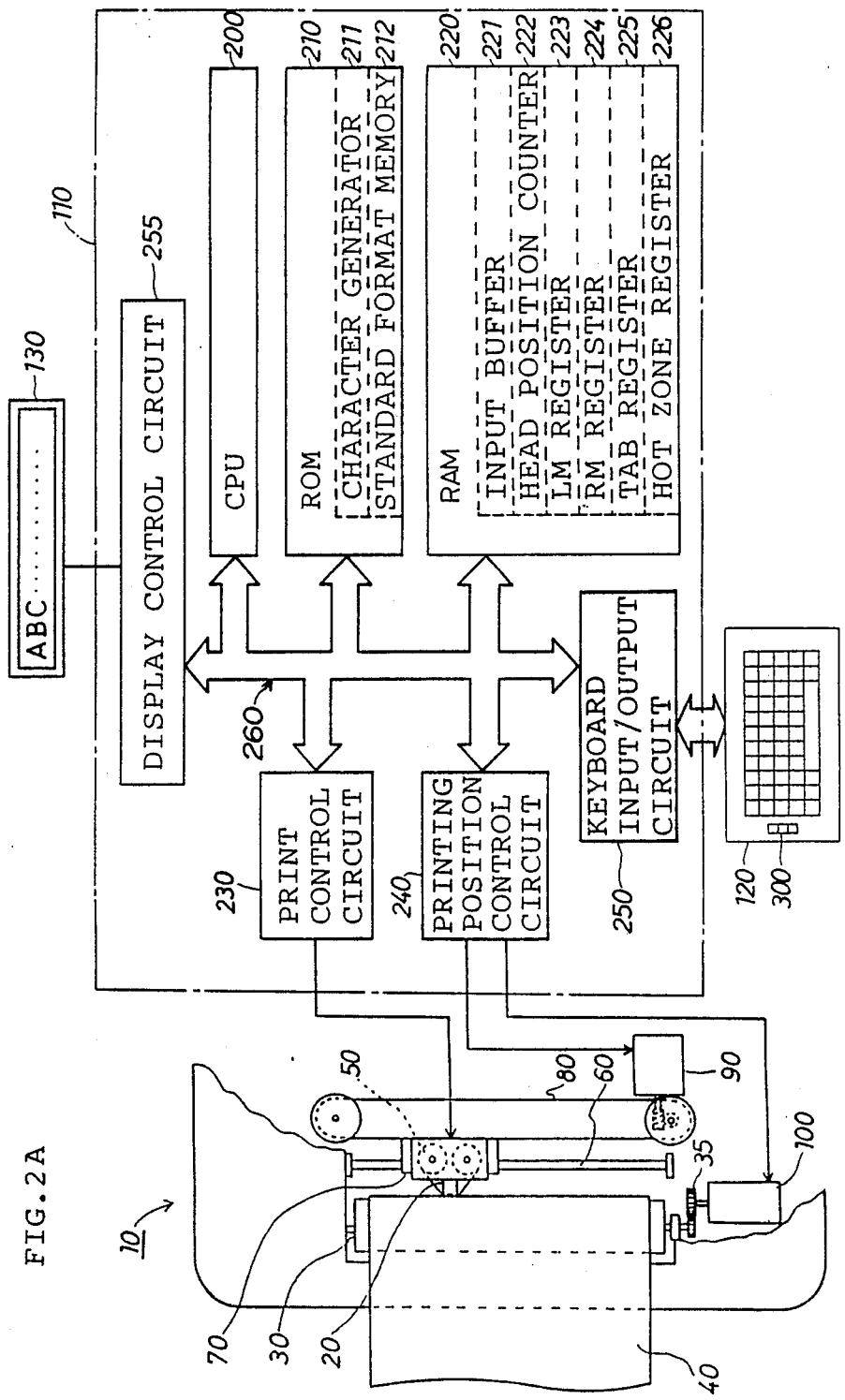
Figure 2B:
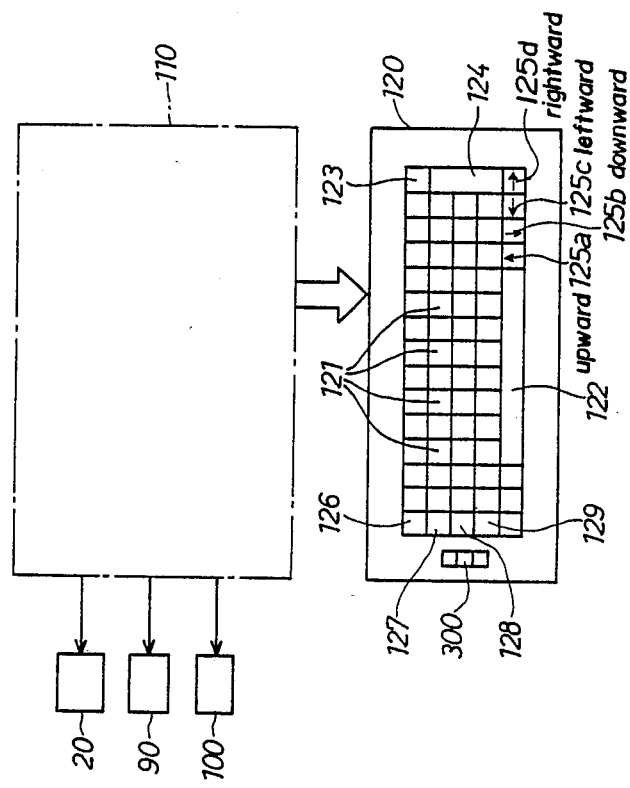

One of embodiments is now disclosed, referring to FIG.2A illustrating the constitution of an electronic typewriter 10 embodying the present invention. The electronic typewriter 10 prints characters on a sheet 40 which is arranged around a platen 30 with a printing head 20. The printing head 20 and a printing ribbon 50 are provided on a carriage 70 which is attached to slide along a guide shaft 60. The carriage 70 is activated by a carriage stepping motor 90 by means of a belt 80 so that the printing head 20 can be shifted into a desirable position. The platen 30 is activated by a linefeed stepping motor 100, which are connected with each other by means of gears 35, so as to shift the sheet 40 into a desirable position.

An electronic control device 110 controls the stepping motors 90 and 100, and the operation of the printing head 20. Data inputs and user's instructions are executed via the keyboard 120 which is associated with the electronic control device 110. The characters inputted by a user are displayed on the liquid crystal display unit 130. This display unit 130 allows up to 16 characters to appear on the screen at one time.

The electronic control device 110 comprises CPU 200, ROM 210, RAM 220, a print control circuit 230 which is associated with the printing head 20 to control printing, and a printing position control circuit 240 which is associated with the stepping motors 90 and 100 to control the movement of the printing head 20 with respect to the sheet 40. It further comprises a keyboard input/output circuit 250 which is associated with the keyboard 120, a display control circuit 255 which is associated with the display unit 130, and a bus line 260 connecting these facilities with each other. ROM 210 is assigned storage area predetermined addresses, and the predetermined addresses correspond to storage areas including a character generator 211 storing dot-matrix font patterns indicating character and symbol data to be displayed on the display unit 130, and a standard format memory 212 storing the standard format.

RAM 220 is assigned storage area at predetermined addresses, and the predetermined addresses correspond to storage areas including an input buffer 221, and a head position counter 222 which stores a position data of the carriage 70, i.e., the position data of the printing head 20, wherein the position is recognized based on a number of pulses fed from CPU 200 to the stepping motor 90 via the printing position control circuit 240. Also RAM 220 is further assigned storage area predetermined addresses corresponding to an LM register 223 storing the position of the left margin, an RM register 224 storing the position of the right margin, a tab register 225 storing the position of tabulation, and a hot zone register 226 storing the position of the hot zone.

The keyboard 120 comprises a format setting key 300 which instructs a format setting, character keys 121, a space key 122, a back space key 123, a return key 124, cursor shift keys 125a, 125b, 125c, and 125d, which respectively direct the cursor upward, downward, leftward, and rightward, an LM setting key 126, an RM setting key 127, a tabulation setting key 128, and a hot zone key 129.

Figure 3:
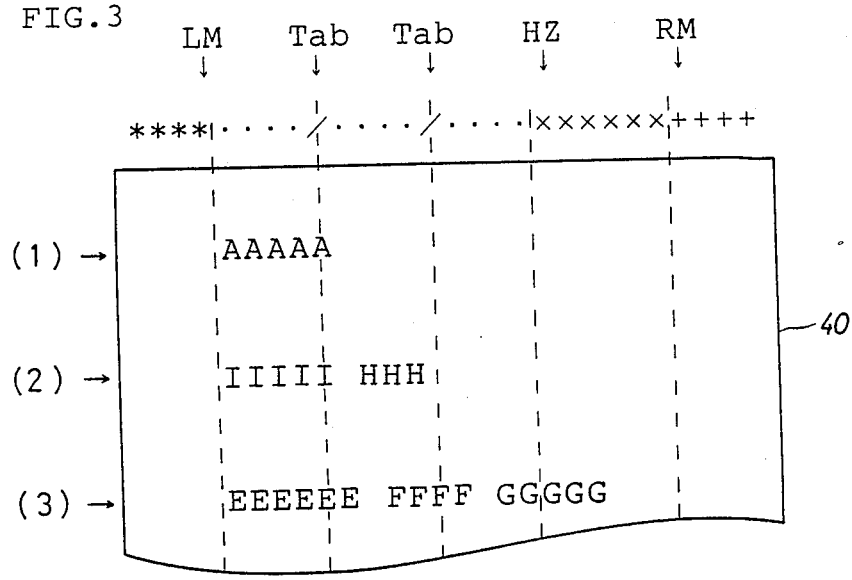

Nevertheless, when the electronic typewriter 10 is set in the Line by Line ( L/L ) mode, data entered from the keyboard 120 are stored in the input buffer 221 and simultaneously characters or symbols corresponding to the data thereof are read from the character generator 211 so as to display them on the display unit 130, so that the depression of the carriage return key 124 lets the entered data be printed by the printing head 20 in accordance with the data stored in the input buffer 221. The display on the display unit 130 and the actual printing position on the sheet 40 are interrelated as shown in FIGS. 3 and 4A–4E. In FIG. 3, format conditions such as left margin LM, right margin RM, tabulation Tab and hot zone, which beginning position is indicated with the abbreviation HZ, are noted above the sheet 40 with corresponding indications for reference. The indication ( * ) denotes the left side of the left margin LM, ( / ) denotes the tabulation position, ( X ) denotes the hot zone, ( + ) denotes the right side of the right margin RM, and ( . )denotes data input positions other than left margin LM, right margin RM, tabulation Tab and hot zone HZ positions. These indications are called individual forms. Moreover the printing conditions on the sheet 40 shown in lines (1), (2) and (3) in FIG. 3 shall be referenced respectively with FIGS. 4A, 4B and 4D which illustrate the corresponding display conditions.

Usually the display capacity on the display unit 130 is less than that of the actual single line to be printed on the sheet 40. As an advantage of the present invention, the current cursor position with regard to the entire format on the sheet 40 is easily understood, because the format indications tell a user both where the cursor is at the moment and also the condition in the blank area where no character is entered.

Figure 4A:
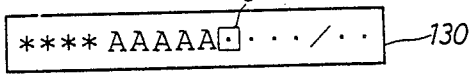

FIG. 3 (1) shows the situation when five characters have been inputted from the left margin LM; the corresponding display on the display unit 130 is shown in FIG. 4A. The display indicates the five characters entered from the left margin LM, which is indicated distinctly by ( * ), and also indicates the tabulation set at five positions to the right thereof. In the displays of FIGS. 4A–4E, the cursor denoted with C indicates the next data input position.

Figure 4B:
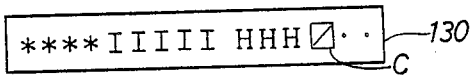

FIG.3 (2) illustrates the situation during character entry when the cursor C is approaching the hot zone, while FIG.4B shows its corresponding display on the display unit 130. The tabulation is set at the next input position here.

Figure 4C:
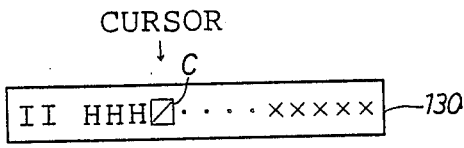
Figure 4D:
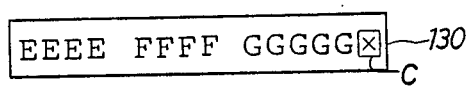
Figure 4E:
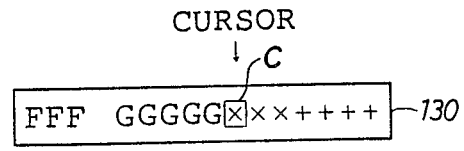

As is common in the conventional electronic typewriters, the cursor C of the present typewriter 10 can be moved in left and right directions in accordance with instructions from the cursor shift keys 125c and 125d. For example, if the cursor shift key 125d is depressed to instruct the cursor C to move rightward when the cursor C is presently at the right end of the display screen 130, the cursor C remains at the same position, i.e., at the right end thereof, while the display is scrolled leftward. Accordingly, if the depression is performed nine times on the rightward cursor shift key 125d and further nine times on the leftward cursor shift key 125c by an operator, the display on the display unit 130 shown in FIG.4B will be changed into that as shown in FIG.4C. Thus, such display lets the user know at a glance at the display unit 130 how many digits exist between the cursor position C and the hot zone. However, such series of operation as to depress nine times the leftward cursor shift key 125c may be substituted with a relocated key (not shown), which is specially arranged to simplify such operations. Further, FIG.3 (3) shows that the cursor C is approaching the right margin RM when characters are entered within the hot zone. The corresponding display is shown in FIG.4D. If the leftward cursor shift key 125c and rightward cursor shift key 125d are depressed respectively six times, the display on the display unit 130 results in as shown in accordance with FIG.4E. In the display, the indications ( X ) denoting the hot zone and ( + ) denoting the right margin RM signify that the entry of three more characters will put the cursor C at the right margin.

Figure 5A:
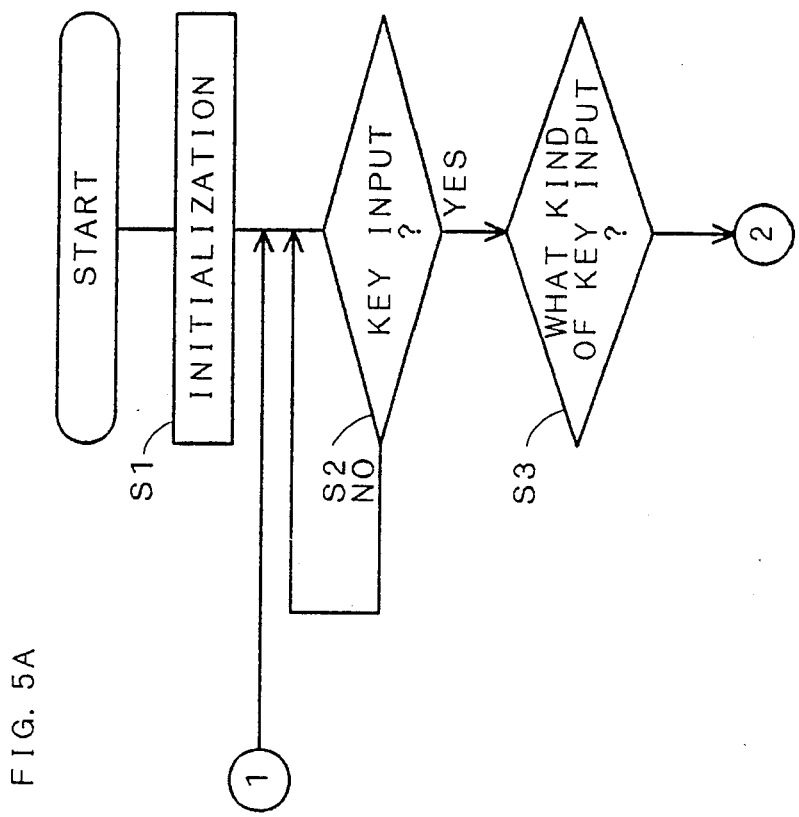
Figure 5B:
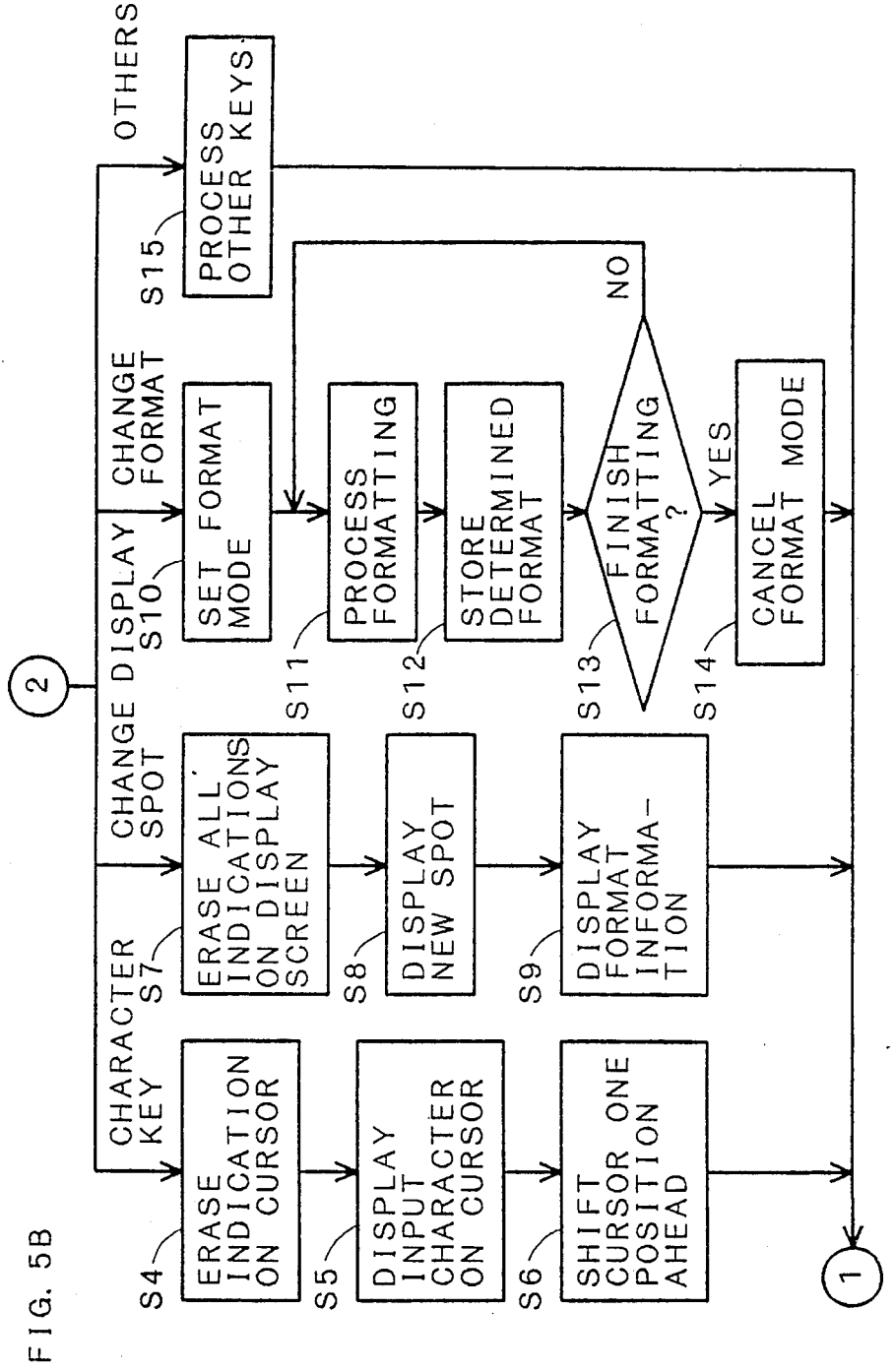

These displays are accomplished by the predetermined program, which the following explains in conjunction with the flow charts shown in FIGS.5A and 5B. In the flow charts, each step is denoted with the abbreviation S.

Upon switching on the electric typewriter 10, the process starts with the initialization of S1 so that the indications showing the initial format appear on the display unit 130 in accordance with a predetermined standard format data stored in the standard format memory 212. Namely, the format data stored in the standard format memory 212 are respectively stored in the LM register 223, the RM register 224, the tab register 225, and the hot zone register 226. The character generator 211 feeds the data of symbols to be displayed on the display unit 130 so as to display them each at their right positions. S2 recognizes a key input; if S2 senses key entry, S3 then determines what kind of key entry. S3 distinguishes among entry by a character key 121, a key instructing display of another region such as the carriage return key 124, or cursor shift key 125a or 125b, a key instructing a format change 300, and other kinds of keys.

In case the entry is a character key 121, the corresponding character data are stored in the input buffer 221. S4 erases the format indication presently appearing at the cursor position, so as to replace it with the entered character at S5. Consequently, S6 shifts the cursor C one position forward and the process returns to S2.

If the key entry by a user instructs to display another region, such as upward or downward cursor shift keys 125a or 125b, the carriage return key 124, or so on, S7 erases all current indications shown on the display unit 130. S8 changes the region of display unit 130 and displays characters contained in the new region instructed by a user. Then S9 fills the blanks, where no character is displayed by S8, with format indications. In other words, S7, S8 and S9 change the region of display when a user depresses the cursor shift keys 125a or 125b, the carriage return key 124, or such, the display shows a new region containing the cursor C, which is shifted out of the previous display thereby. The process returns to S2 after these steps.

Further in case the entry is by the format key 300, which instructs to set or change the format, S10 sets the electronic typewriter 10 in the format mode, wherein the margins and tabulations are set, and other format-setting process is also executed. At S11, after the carriage 70 is moved by a user into desired format positions defining the format with a space key 122 and a backspace key 123, the format-setting process is performed by a user such that the right and left margins, tabulation, decimal tabulations and such are determined by means of the format-setting keys 126, 127, 128, and 129 associated therewith. At S12, RAM 220 stores the new position data of the carriage 70 and the head position counter 222 in the corresponding registers 223, 224, 225, and 226. The new position data represent the position of carriage 70 when the keys 126, 127, 128, 129 are operated in S11. The subsequent step S13 judges if the format-setting process is finished, by first sensing a second entry by a format-setting key 300. If S13 determines that format-setting is not finished yet, the format-setting process continues. If the format-setting key 300 is depressed again, S14 cancels the format mode and the process returns to S2.

Otherwise if S3 recognizes a key entry instructing other commands, S15 forwards the instructed process accordingly and the process returns to S2.

As described above, this embodiment fills the blanks, where no character is currently displayed, with the format indications on the display unit 130. As has been explained, the character display line in the display unit 130 is also provided with the format information. Despite the present embodiment comprises only a single display unit 130 and moreover it is such a small screen relative to the sheet 40, the format information of the current input area and moreover the other blank areas where no character data is inputted can be displayed on the screen so as to let a user know the necessary format information. The typewriter can be of a small size, because the single screen makes the structure simpler and it requires less width on the typewriter. Alternatively, this embodiment may be used like other wellknown electronic typewriters, where the format-setting and the modification thereof is easily made without using any particular format-setting mode, however, this described embodiment has a special format-setting mode.

As another alternative for display, the input characters may each be displayed upon entry with a different predetermined color than that of the format indications, in order to distinguish the format information from input characters.

Obviously, many modifications and variations of the present invention are possible with regard to the above teachings. It is therefore to be understood that within the scope of the appended claims, the invention may be practiced other than as specifically described.

What is claimed is:

1. A display control device for a typewriter comprising:
    input means for inputting character data and format setting data;
    format memory means for storing the format setting data;
    a display unit having a plurality of display positions, each of said display positions being able to display a character corresponding to the character data inputted by the input means; and control means for displaying individual forms, according to the format setting data stored in the format memory means, within each of the display positions before the character data is inputted, and for displaying the character in place of the individual form when the character data is inputted.

2. The display control device for a typewriter according to claim 1, wherein the format setting data comprises a left margin data, tabulation data, a hot zone data, and a right margin data.

3. The display control device for a typewriter according to claim 1, wherein the individual forms are displayed as individual symbols.

4. The display control device for a typewriter according to claim 1, further comprising initial format memory means for storing standard format setting data, wherein the control means displays individual forms, according to the standard format setting data, within each of the display positions upon switching the typewriter on.

5. The display control device for a typewriter according to claim 1, wherein the number of the display positions is smaller than that of the number of characters printable on a printing sheet being used in the typewriter.

* * * * *